Figure 1:
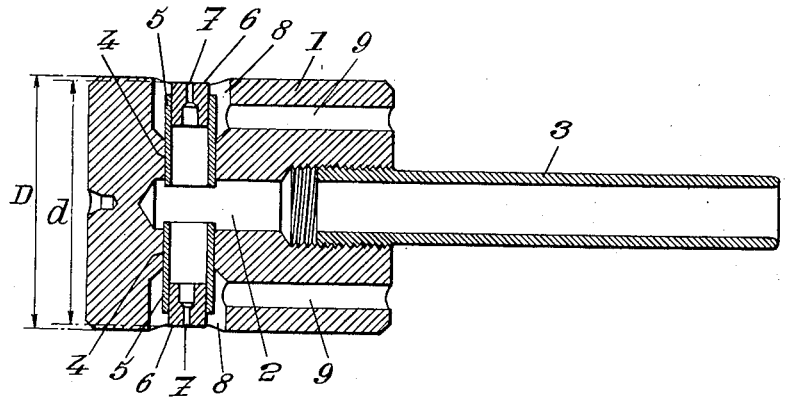

Nov. 7, 1950  M. MENNESSON  2,529,170
PNEUMATIC MICROMETRY PLUG GAUGE
Filed Dec. 18, 1946

INVENTOR
Marcel Mennesson
BY Henry J. Lucke
ATTORNEY

Patented Nov. 7, 1950

2,529,170

UNITED STATES PATENT OFFICE 2,529,170

PNEUMATIC MICROMETRY PLUG GAUGE

Marcel Mennesson, Neuilly-sur-Seine, France, assignor to Societe Anonyme de Construction de Materiel Automobile (S. A. C. M. A.), Neuilly-sur-Seine, France, a society of France Application December 18, 1946, Serial No. 716,980
In France June 6, 1946

5 Claims. (Cl. 73—37.5)

The present invention relates to pneumatic micrometry plug gauges for measuring the inner dimension of a hollow space in a piece (for instance the distance between two walls of said piece or the diameter of a hole or bore provided therein).

Up to the present time, such gauges have consisted of a cylindrical body of a very hard metal provided with housings in which nozzles, also made of a very hard metal, are inserted with a driving fit, which nozzles are rectified to a diameter $d$ slightly smaller than the diameter $D$ of the body.

The plug body must be made of a very hard material in order to be able to resist wear and tear.

On the other hand, the nozzles must also be made of a very hard material because otherwise, when their outer faces are rectified, said nozzles undergo modifications so that they are no longer comparable to one another.

Such gauges are difficult to manufacture because the machining of the outer faces of the nozzles is delicate. Protection of these outer faces is often insufficient. Furthermore, assembly of the nozzles in the body involves serious difficulties for the following reasons:

Fitting of the nozzles in the body constitutes a very delicate problem, because these elements, once treated to harden them, do not, as a rule, fit any longer in one another and must undergo rectification operations before the nozzles can be engaged in the body in suitable fashion. These rectification treatments are very difficult when the nozzles are very small.

In order to overcome this difficulty, according to my invention, each of the nozzles is fitted in a tubular support which, being made of a softer metal, can deform sufficiently to accommodate said nozzle, and, for the same reason, the tubular support can be fitted relatively easily in the plug body.

On the other hand, in pneumatic micrometry gauges, the distance between the outer face of a nozzle and the inner wall of the hollow space of the piece in which said gauge is inserted, should, for a given piece, remain unchanged when the temperature changes, as, otherwise, the measurement would vary according to the temperature.

Now, when the nozzles are fitted directly in the plug body, as the coefficient of expansion of the metal of the plug body is, as a rule, very different from that of the piece to be measured, this distance necessarily varies with the temperature.

To overcome this difficulty, according to my invention, the tubular support is made of a metal having the same coefficient of expansion as the piece to be measured so that the above mentioned distance is uninfluenced by temperature variations.

Figure 2:
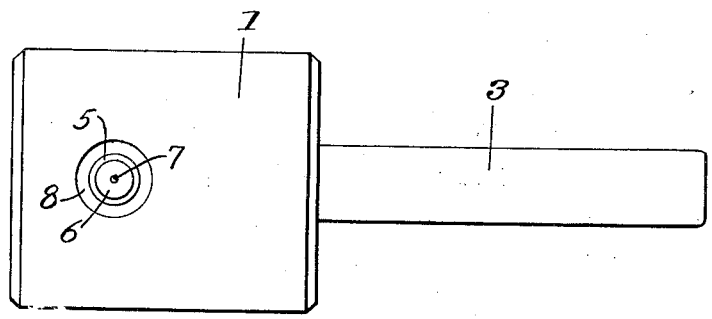

A preferred embodiment of my invention will be hereinafter described with reference to the accompanying drawings, given merely by way of example, and in which:

Figs. 1 and 2 show, respectively in axial section and in plan view, a plug gauge made according to my invention.

In the example shown in Figs. 1 and 2, the plug gauge includes a cylindrical body or guide 1, which is intended to be inserted into the interval, hole or bore to be measured or checked.

This body 1 is made of a very hard material, for instance hardened steel, so that it can resist wear and tear. In this body is provided an axial blind hole 2 in which is secured, for instance by screwing, a hollow handle 3 which may be connected with a pipe for feeding a fluid under pressure.

The inner end of axial conduit 2 communicates with two passages 4, extending for instance at right angles to the conduit and diametrally opposed. A tube 5 is driven into each passage 4, the free end of this tube forming a housing for a nozzle 6 provided with a calibrated orifice 7 and made of a hard metal, such as hardened steel. Tubes 5 are made of a metal which is easier to machine and more ductile than those used to make body 1 and nozzle 6, for instance of semi-hard steel. It can therefore be easily engaged into passage 4 despite any variations as may have occurred in the dimension of said passage during the hardening treatment of body 1. Likewise, nozzle 6 can easily be engaged into the free end of tube 5 which acts as support for it.

Furthermore, tubes 5, which support nozzles 6, are advantageously made of a matter identical to that of the piece to be measured or, anyway, having a predetermined expansion coefficient, so that temperature variations do not influence the accuracy of the measurement when the latter is performed at a temperature different from that at which the gauge dimensions have been determined.

Tubes 5 may be fitted in passage 4 very close to the axis of body 1. This is advantageous because steel deforms upon hardening and is fully stabilized only a very long time thereafter and the more the nozzles are made independent of the mass of body 1, the less they are influenced by the deformations that take place in the course of this stabilization.

Around each nozzle 6 and the outer end of its tubular support 5, I provide, in body 1, an annular interval 8 which communicates with a conduit 9, parallel to the axis of body 1 opening into the rear face thereof so as to permit evacuation of the fluid fed through nozzle 6.

In order to assemble a plug gauge of this type, I first fit nozzles 6 in their tubular supports and then I insert the latter with a driving fit into the passages 4 that constitute their housings. The insertion is carried out in such manner that the outlets of nozzles 6 are flush with, or project slightly from, the external face of the body or skirt 1 of the plug. The nozzles and the skirt are then rectified simultaneously, by passing them in a rectifying machine tool (lathe) so as to give body 1 its final diameter D, the outlets of the nozzles being consequently at the distance D from each other. Then, preferably by means of the machine hereafter described, I sink in, to the desired degree, each tubular support 5 with the nozzle 6 housed therein, into the corresponding passage 4, so that the outlets of the nozzles are at a distance $d$ from each other smaller than D. The nozzles are thus well protected on all sides.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A pneumatic micrometry plug gauge for measuring the inner dimension of a hollow space in a piece which comprises, in combination, a guide plug body of very hard metal having its outer wall adapted to fit in said space and provided with a conduit for feeding a gaseous fluid under pressure to the inside of said body and at least one passage extending between said conduit and said wall, a tubular support of a softer metal fitted in said passage, said tubular support being of a metal having substantially the same coefficient of expansion as that of the piece, and a nozzle of a very hard metal fitted at the peripheral end of said tubular support, the outer face of said nozzle being sunk with respect to said wall.

2. A pneumatic micrometry plug gauge for measuring the inner dimension of a hollow space in a piece which comprises, in combination, a guide plug body of very hard metal having its outer wall shaped to fit in said space and provided with a conduit for feeding a gaseous fluid under pressure to the inside of said body and at least two passages extending between said conduit and said wall in the same respective transverse directions with respect thereto, tubular supports of a softer metal fitted in said passages respectively, said tubular supports being of a metal having substantially the same coefficient of expansion as that of the piece, and nozzles of a very hard metal fitted at the peripheral ends of said tubular supports respectively, the outer faces of said nozzles being sunk, all to the same degree, with respect to said wall.

3. A pneumatic micrometry plug gauge for measuring the inner dimension of a hollow space in a piece which comprises, in combination, a guide plug body of very hard metal having a circular cylindrical outer wall adapted to fit in said space and provided with a conduit for leading a gaseous fluid under pressure to the inside of said body and with at least two radial passages extending between said conduit and said wall symmetrically about the axis of said wall, tubular supports of a softer metal fitted in said passages respectively, said tubular supports being of a metal having substantially the same coefficient of expansion as that of the piece, and nozzles of a very hard metal fitted at the peripheral ends of said tubular supports respectively, the outer faces of said nozzles being at a distance from said axis smaller than the radius of said wall.

4. A pneumatic micrometry plug gauge for measuring the inner dimension of a hollow space in a piece which comprises, in combination, a guide plug body of very hard metal having a circular cylindrical outer wall adapted to fit in said space and provided with a conduit for feeding a gaseous fluid under pressure to the inside of said body and with at least two radial passages extending between said conduit and said wall and diametrally opposed to each other, tubular supports of a softer metal fitted in said passages respectively, said tubular supports being of a metal having substantially the same coefficient of expansion as that of the piece, and nozzles of a very hard metal fitted at the peripheral ends of said tubular supports respectively, the outer faces of said nozzles being at a distance from the axis of said cylindrical wall smaller than the radius thereof.

5. A pneumatic micrometry plug gauge for measuring the inner dimension of a hollow space in a piece which comprises, in combination, a guide plug body of very hard metal having a circular cylindrical outer wall adapted to fit in said space and provided with an axial conduit for feeding a gaseous fluid under pressure to the inside of said body and with at least two radial passages extending between said conduit and said wall at regular angular intervals about the axis of said wall, tubular supports of a softer metal fitted in said passages respectively at points thereof close to said axis, said tubular supports being of a metal having substantially the same coefficient of expansion as that of the piece, and nozzles of a very hard metal fitted at the peripheral ends of said tubular supports respectively, the outer faces of said nozzles being at a distance from said axis smaller than the radius of said wall.

MARCEL MENNESSON.

REFERENCES CITED

The following references are of record in the file of this patent:

UNITED STATES PATENTS

| Number | Name | Date |
| --- | --- | --- |
| 1,838,005 | Sieper | Dec. 22, 1931 |
| 2,358,769 | Aller | Sept. 19, 1944 |
| 2,360,705 | Moore | Oct. 17, 1944 |
| 2,370,219 | Aller | Feb. 27, 1945 |
| 2,397,084 | Bernhardt | Mar. 26, 1946 |